May 30, 1967  J. MORLON  3,322,377
ANTI-VIBRATION RESILIENT SUPPORTS
Filed March 24, 1965  2 Sheets-Sheet 1
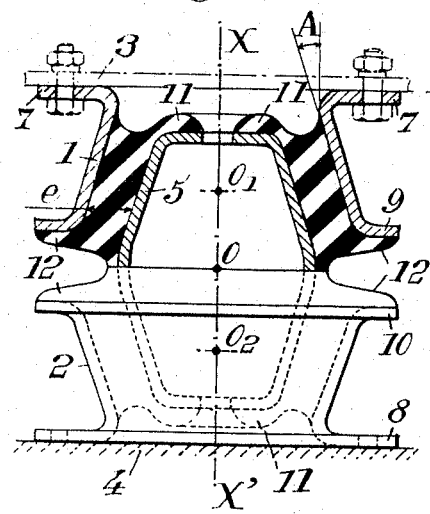
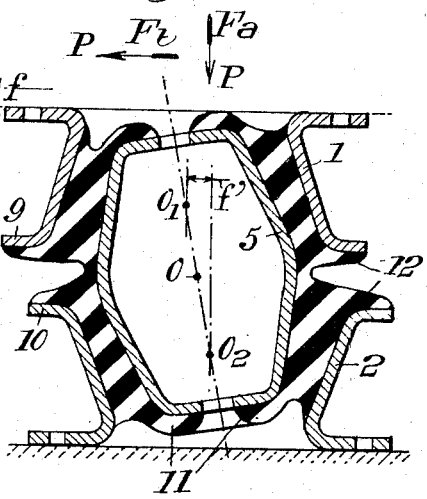
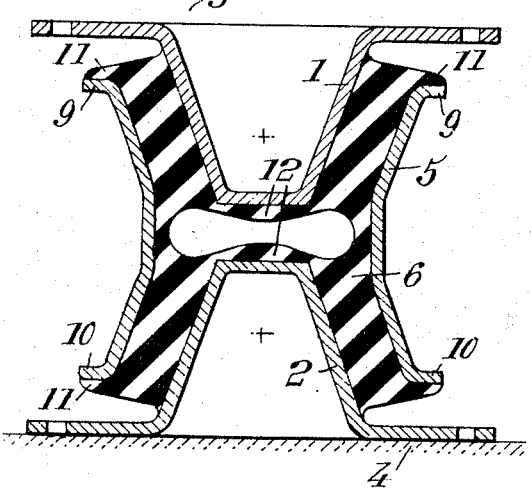

United States Patent Office 3,322,377
Patented May 30, 1967

3,322,377
ANTI-VIBRATION RESILIENT SUPPORTS
Jean Morlon, Bourg-la-Reine, France, assignor to Paulstra
Filed Mar. 24, 1965, Ser. No. 442,405
Claims priority, application France, Apr. 9, 1964, 970,404
3 Claims. (Cl. 248—10)

This present invention relates to anti-vibration resilient supports including rubber or another elastomer adherent to metallic armatures and serving for instance to ensure the resilient suspension of machines or other systems, either with a view to protect them against shocks and vibrations, or to prevent them from transmitting these vibrations to the surrounding structures.

The chief object of the present invention is to provide supports of improved efficiency.

The invention relates to supports of the kind in question including, in addition to the armatures to be fixed respectively to the supported and supporting structures, at least one third armature capable of oscillating with respect to the preceding ones and connected thereto through adherent rubber, the whole of said third armature and said elastomer block constituting the only connection between the two first mentioned armatures, whereby, in addition to the axial resiliency resulting from the movements of said two structures toward and away from each other, there is obtained, by the oscillation of said third armature, a resiliency in at least one transverse direction.

According to the present invention:

(a) The fixed first rigid armature, secured to the supporting structure, has a vertical axis of symmetry. The sections of said first armature taken in planes perpendicular to said axis consist of closed curves symmetrical about said axis. The vertical sections of said first armature taken in planes passing through said axis consist of pairs of substantially straight lines oblique to said axis and symmetrical with respect to each other and with respect to said axis.

(b) The movable second rigid armature, secured to the supported structure, has an axis of symmetry normally in coincidence with said first mentioned axis of symmetry. The vertical sections of said second armature taken in planes perpendicular to said second mentioned axis of symmetry consist of closed curves symmetrical about said second mentioned axis. The sections of said second mentioned armature taken in planes passing through said second axis consist of pairs of substantially straight lines oblique to said second axis and symmetrical with respect to each other and with respect to said second axis, the obliquity of the lines of the said second armature in the vertical sections being opposed to those of the lines in the said first armature.

(c) The movable third rigid armature is symmetrical about an axis fixed with respect thereto. Every section of said third armature taken in a plane passing through its axis consists of two pairs of substantially straight lines, the lines of one pair making an angle with each other substantially equal to that angle made by the two lines in the vertical section of said first armature located on the same axial plane, and the lines of the other pair make an angle with each other substantially equal to that angle made by the two lines in the vertical section of said second armature located in the same axial plane.

(d) The elastomer block is arranged so that the side wall of said third armature located opposite said first armature is normally substantially parallel thereto and the side wall of said third armature located opposite said second armature is normally substantially parallel thereto.

(e) Most of the horizontal sections of said elastomer block intersect either both said first and said third armatures or both said second and said third armatures.

(f) The length of each portion of the elastomer block located between said third armature and each of said first and second armatures taken in the direction of the said armature lines taken in the vertical planes is several times the thickness of said elastomer block measured transversely to said lines.

Preferred embodiments of the present invention will be hereinafter described with reference to the appended drawings, given merely by way of example, and in which:

FIG. 1 diagrammatically shows, partly in elevation and partly in axial section, a resilient support made according to the present invention;

FIG. 2 is a similar view of the same support when subjected to a load having a vertical component and a horizontal component;

FIG. 3 is a sectional view of a modification;

Figure 4:
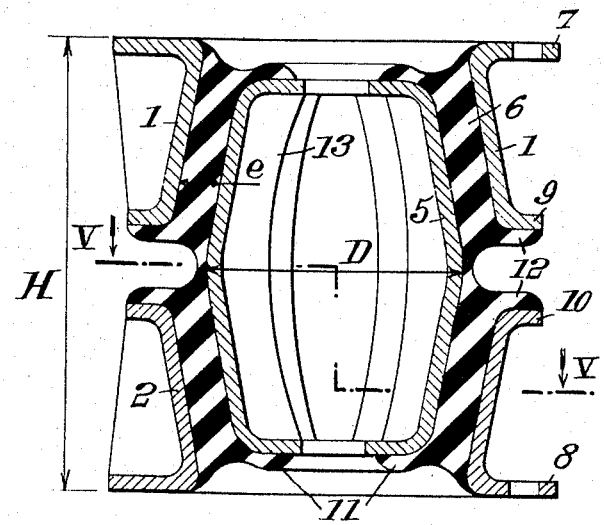
FIG. 4 is a view similar to FIG. 1 illustrating a support made according to the present invention and based upon the principle illustrated by FIG. 1.

The invention relates to anti-vibration resilient supports.

It should be reminded that, in most cases, the supports of the known type are efficient for a given direction, generally the vertical direction corresponding to the action of gravity.

Now, there are however many cases, in particular on board ships, aircraft, road or rail vehicles, where it is not possible to know in advance the direction of the shocks of vibrations that may occur. It may even happen that these shocks or vibrations occur, either simultaneously or not, in different directions of space. The present invention is concerned with supports which must be efficient in all directions.

It is further known that the efficiency of a suspension (with restrictions relative to some possibilities of resonance) is the greater as the natural frequency of the oscillations in a given direction is lower, that is to say as the suspension is more flexible. It has been found that, in most of the cases occurring in practice, a good result is obtained when the natural frequency of oscillation is lower than, or equal to, five periods of Hertz in the direction that is considered. This result is obtained with supports making use of rubber elements if the static deformation, under the effect of the nominal load supposed to be applied in the direction of the vibration, is higher than, or equal to, 12 mm.

According to the present invention the resilient support has substantially the same resiliency in all directions (or at least in two preferred directions).

Supposing that the resiliency complies with these conditions and that the deformation under a load equal to the weight applied to the support is substantially equal to at least 12 mm. in all directions, a machine mounted on such supports will have, for any oscillation with one degree of freedom, in any direction of space, a natural frequency lower than, or equal to, five Hertz.

For instance, as shown by FIGS. 1 and 2, a support according to the present invention comprises two metallic armatures 1 and 2 of frusto-conical shape having their respective larger portions located directly opposite each other, said armatures 1 and 2 being respectively fixed to the supported structure 3 and the supporting structure 4. Between said armatures 1 and 2 there is interposed a floating armature 5 in the form of two conical frustums fixed together through their larger bases, this floating armature 5 being separated from armatures 1 and 2 by rubber 6 made adherent to said armatures through any known method.

Armatures 1 and 2 comprise flanges 7 and 8 through which they are fixed to structures 3 and 4 respectively. Said armatures 1 and 2 further include two flanges 9 and 10 along which rubber may extend.

Furthermore, abutments constituted by rubber masses such as 11 and 12 carried by armatures 1 and 2 are provided so that, when an excessive load is applied along axis X–X', these abutments 11 and 12 are gradually brought into play to limit the deformation.

Such a system truly complies with the conditions above stated, that is to say reacts both to axial oscillations and to transverse oscillations.

Considering a load having axial components $Fa$ and transverse components $Ft$, it will be seen that, on the one hand, the axial components $Fa$ produce a displacement $f$ in the axial direction, whereas, on the other hand, the transverse components $Ft$ produce a displacement $f'$ in the transverse direction, due to the oscillations of floating armature 5 as shown by FIG. 2.

This floating armature 5, the center of which is shown at 0, moves substantially as a connecting rod pivoted about two centers such as $0_1$ and $0_2$.

It is possible to obtain that displacements $f$ and $f'$ are substantially equal, this result being obtained by giving the rubber a suitable thickness $e$ as a function of its height H (FIG. 4).

Figure 5:
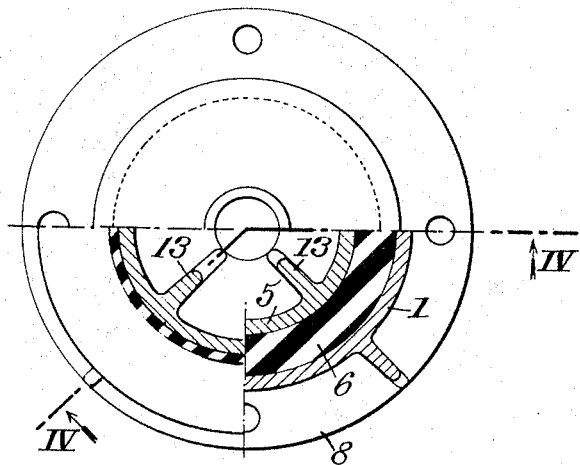
FIG. 5 shows, partly in plane view and partly in section on the line V—V of FIG. 4, the same support.

FIGS. 4 and 5 show in a more detailed fashion a support of the kind of that of FIGS. 1 and 2, the central armature 5 being provided with stiffening ribs 13.

By way of example, a support of this kind, capable of supporting loads of an order ranging from 2,000 to 4,000 kgs., might have the following dimensions.

|  | mm. |
| --- | --- |
| Height H | 290 |
| Diameter D of the floating armature | 160 |
| Thickness $e$ of the rubber | 25 |
| Angle A of the cone, 10°. | |

For a given rubber, the static deformation under such loads ranging from 2,000 to 4,000 kgs. would be of the order of magnitude of 12 mm., the hardness of the rubber material used being chosen in accordance with the load and increasing therewith.

The reaction to the vertical components is substantially of the same order of magnitude as the reaction to the transverse components.

FIG. 3 shows a modification wherein the floating armature 5 is located on the outside of armatures 1 and 2, the result that is obtained remaining the same.

In a general manner, while the above description discloses what are deemed to be practical and efficient embodiments of the present invention, said invention is not limited thereto as there might be changes made in the arrangement, disposition and form of the parts without departing from the principle of the invention as comprehended within the scope of the appended claims.

What I claim is:

1. A resilient support comprising a fixed first rigid armature having flange means for securement to a supporting surface, a moveable second rigid armature having flange means for securement to a supported object, a moveable third rigid armature and at least one block of elastomer interposed between said first and third armatures and between said second and third armatures and adherent to said armatures, said third armature and said elastomer block constituting, together, the only connection between said two first mentioned armatures, wherein, (a) said fixed first rigid armature has a vertical axis of symmetry, the sections of said first armature taken in planes perpendicular to said axis consisting of closed curves symmetrical about said axis, the vertical sections of said first armature taken in planes passing through said axis consisting of pairs of substantially straight lines oblique to said axis, and symmetrical with respect to each other and with respect to said axis, (b) said movable second rigid armature is disposed in opposed spaced relation to said first armature and has an axis of symmetry normally in coincidence with said first mentioned axis of symmetry, the sections of said second armature taken in planes perpendicular to said second mentioned axis of symmetry consisting of closed curves symmetrical about said second mentioned axis, the vertical sections of said second mentioned armature taken in planes passing through said second axis consisting of pairs of substantially straight lines oblique to said second axis and symmetrical with respect to each other and with respect to said second axis, the obliquity of the lines of the said second armature in the vertical sections being opposed to those of the lines in the said first armature vertical sections, (c) said movable third rigid armature normally is disposed in opposed spaced relation to both said first and second armatures about said vertical axis and is symmetrical thereabout, every section of said third armature taken in a plane passing through its axis consisting of two pairs of substantially straight lines, the lines of one pair making an angle with each other substantially equal to that angle made with the two lines in the vertical section of said first armature located in the same axial plane, the lines of the other pair making an angle with each other substantially equal to that angle made by the two lines in the vertical section of said second armature located in the same axial plane, (d) said elastomer block is arranged so that the side wall of said third armature located opposite said first armature is normally substantially parallel thereto and the side wall of said third armature located opposite said second armature is normally substantially parallel thereto, (e) most of the horizontal sections of said elastomer block intersect either both said first and said third armatures or both said second and said third armatures, and (f) the length of said vertical section lines of each portion of said elastomer block located between said third armature and each of said first and second armatures taken in the direction of the said armature lines taken in the vertical planes is several times the thickness of said elastomer block measured transversely to said lines.

2. A resilient support according to claim 1 wherein said armatures are surfaces of revolution about a common vertical axis which is obtained when said block of elastomer is not stressed in a horizontal direction.

3. A support according to claim 1 wherein said elastomer block has a portion thereof interposed directly between said first and second armatures, to constitute an abutment limiting the vertical displacement of said second armature.

References Cited

UNITED STATES PATENTS

| 2,019,052 | 10/1935 | Lord | 248—10 X |
| 2,459,741 | 1/1949 | Kubaugh | 248—22 |
| 2,482,488 | 9/1949 | Julien. | |
| 2,510,979 | 6/1950 | Ivanovic | 248—358 |
| 2,858,127 | 10/1958 | Moulton. | |

FOREIGN PATENTS

| 794,254 | 4/1958 | Great Britain. |

CLAUDE A. LEROY, *Primary Examiner.*

JOHN PETO, *Examiner.*